April 18, 1933.   H. C. SCHAPER   1,904,542
AUTOMATIC WEIGHT INDICATING SCALES
Filed Aug. 23, 1930   8 Sheets-Sheet 1

Inventor
Harry C. Schaper
By William Janus Atty.

April 18, 1933. H. C. SCHAPER 1,904,542
AUTOMATIC WEIGHT INDICATING SCALES
Filed Aug. 23, 1930 8 Sheets-Sheet 2

Inventor
Harry C. Schaper
By William Jamie Atty.

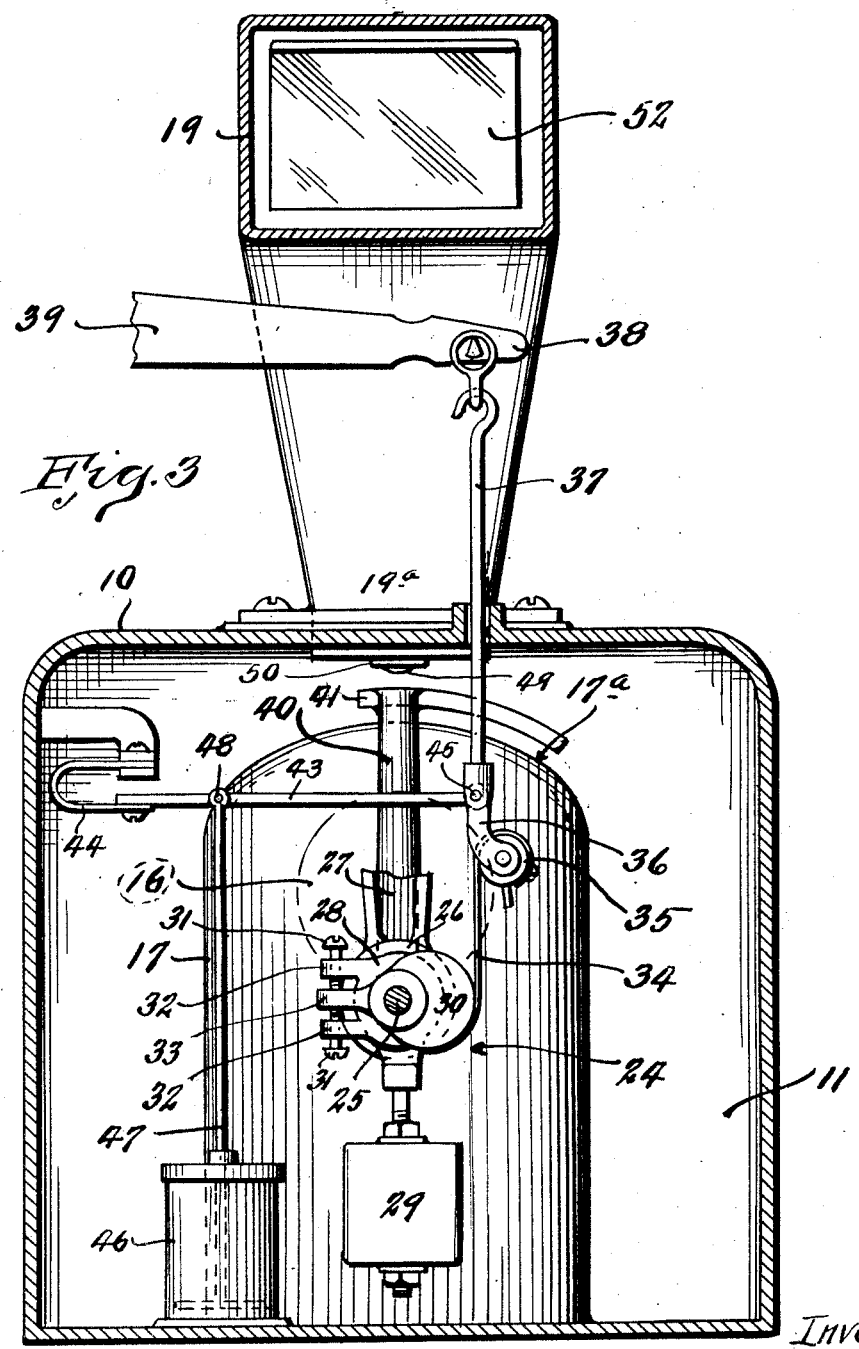

April 18, 1933.   H. C. SCHAPER   1,904,542
AUTOMATIC WEIGHT INDICATING SCALES
Filed Aug. 23, 1930   8 Sheets-Sheet 4
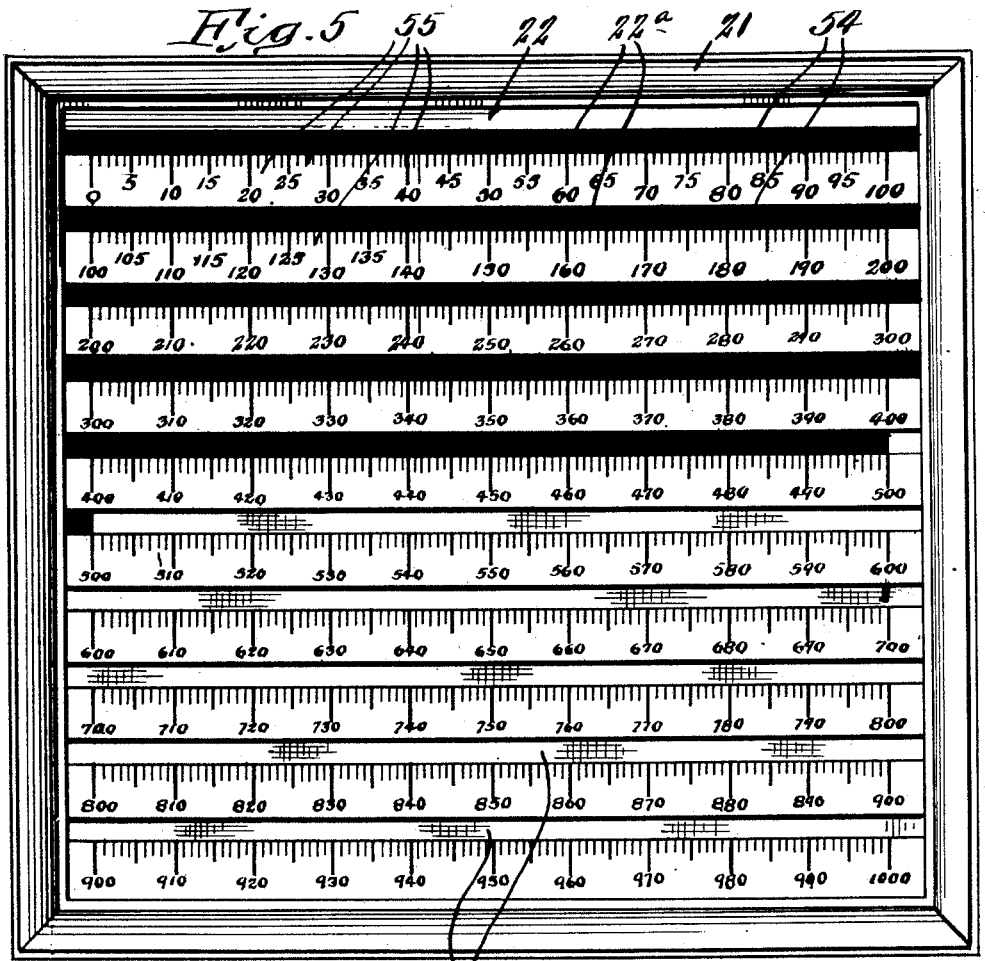
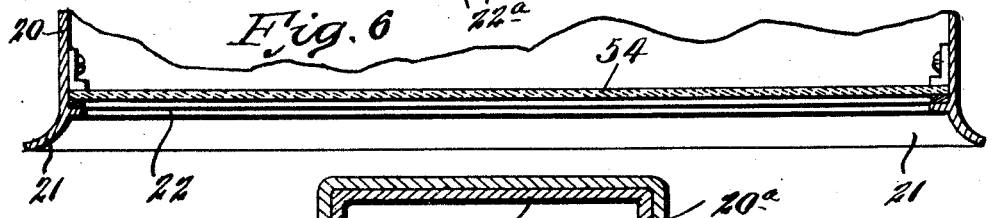
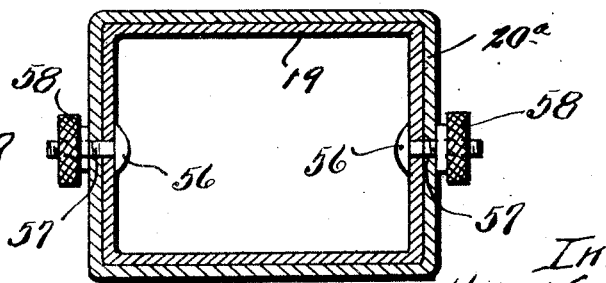
Inventor
Harry C. Schaper
By William Jannse atty.

April 18, 1933.   H. C. SCHAPER   1,904,542
AUTOMATIC WEIGHT INDICATING SCALES
Filed Aug. 23, 1930   8 Sheets-Sheet 5

Inventor
Harry C. Schaper,
By William Hannis, Atty.

April 18, 1933. H. C. SCHAPER 1,904,542
AUTOMATIC WEIGHT INDICATING SCALES
Filed Aug. 23, 1930 8 Sheets-Sheet 6
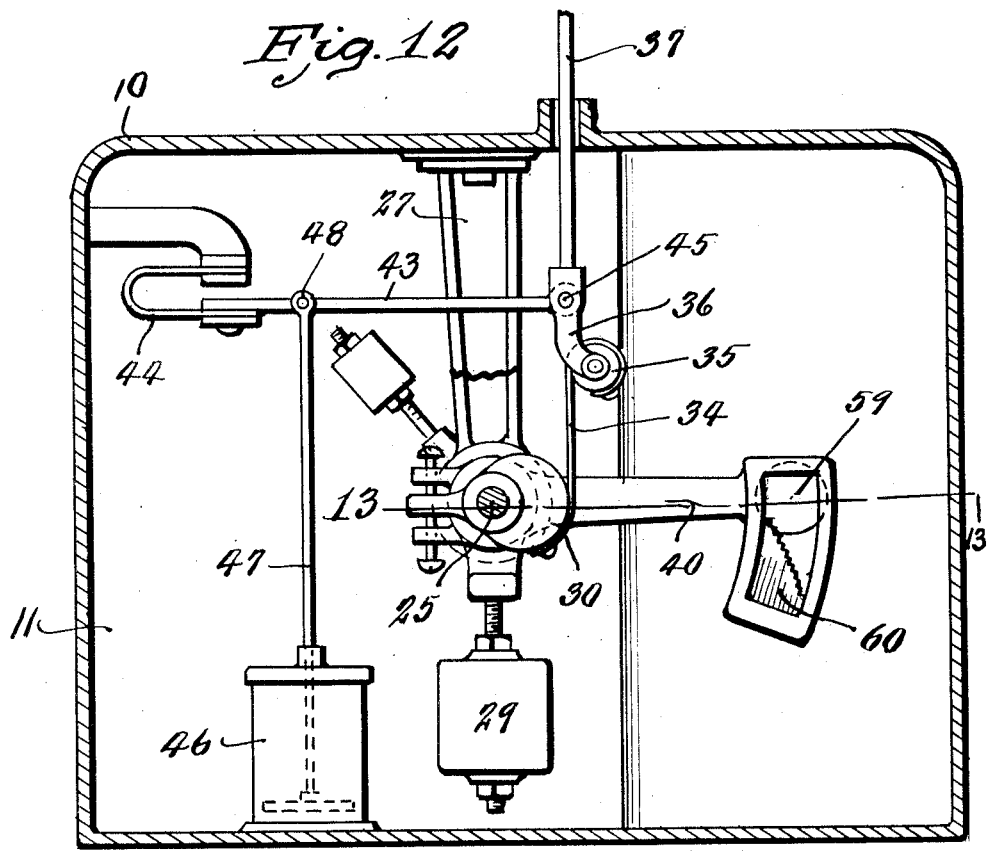
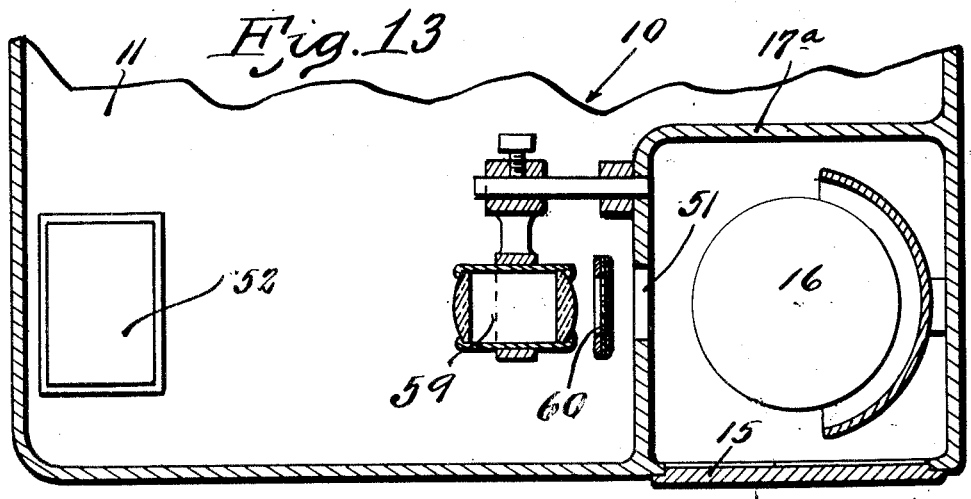
Inventor
Harry C. Schaper
By William Janus Atty.

April 18, 1933. H. C. SCHAPER 1,904,542
AUTOMATIC WEIGHT INDICATING SCALES
Filed Aug. 23, 1930 8 Sheets-Sheet 7

Inventor
Harry C. Schaper
By William Janus Atty.

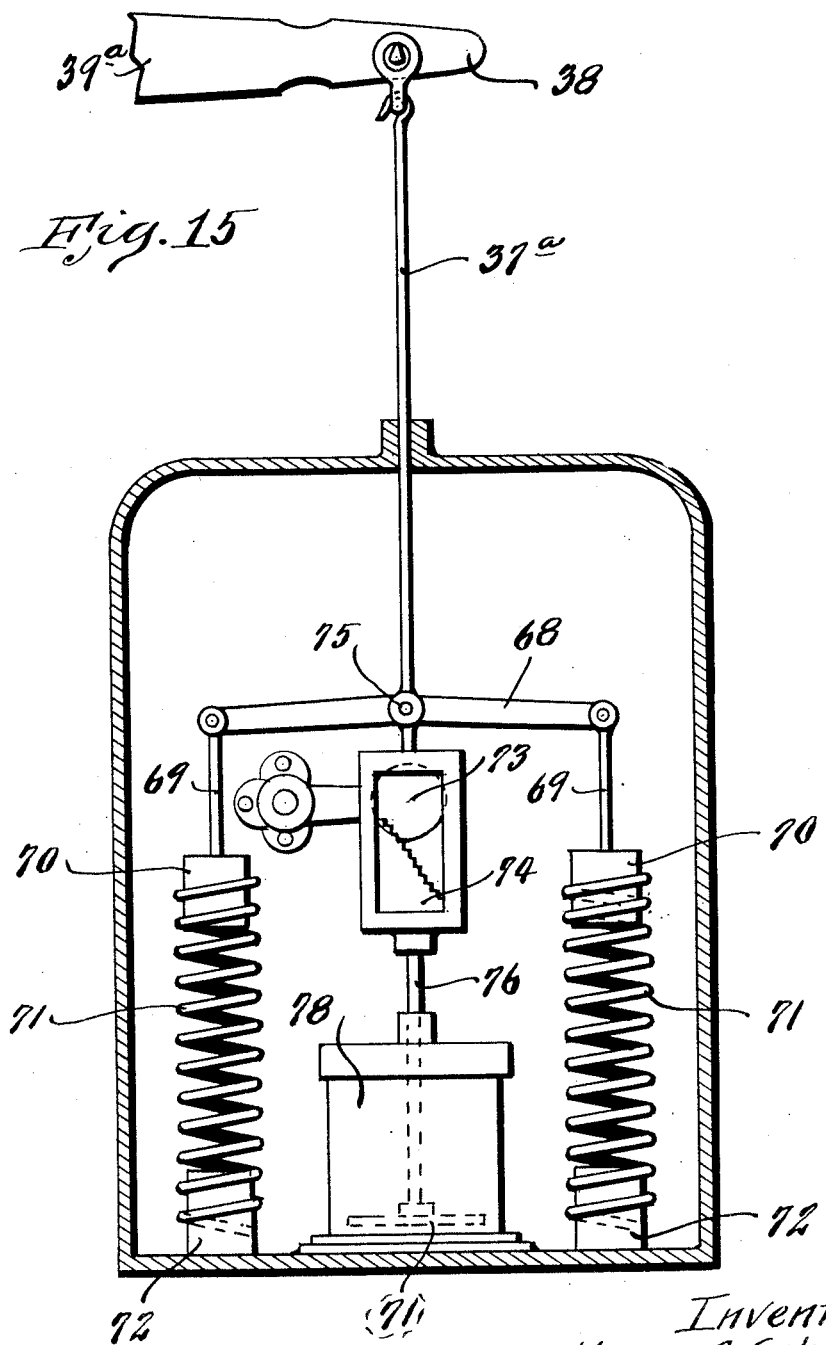

Patented Apr. 18, 1933

1,904,542

UNITED STATES PATENT OFFICE

HARRY C. SCHAPER, OF COLUMBUS, OHIO, ASSIGNOR TO INTERNATIONAL SCALE COMPANY, OF NEW YORK, N. Y., A CORPORATION OF DELAWARE

AUTOMATIC WEIGHT INDICATING SCALE

Application filed August 23, 1930. Serial No. 477,298.

This invention relates to new and useful improvements in automatic weight indicating scales.

The usual form of this type of scale comprises a lever system actuated by loads placed on the scale platform and operating by means of gearing an index finger or hand. This finger or hand is movable in an arc over a stationary chart having a series of weight indicia or marks and numerals located adjacent to its margin.

The usual form of automatic balancing means consists of a pendulum system employing one or more pendulums or gravity weights and mounted for either rotatable or rolling motion. Another form is that wherein one or more springs of either tension or compression type are employed in place of gravity weights. The operative movement of either form is obviously limited. Thus when the capacity of a scale requires a large amount of indicating marks, a direct visible indication from the counterbalancing means is interposed due to the fact that the marks are too small to be read directly.

Thus a stationary chart or dial having indicating marks consisting of one thousand graduations, spaced one-tenth of an inch apart, would require the graduation bearing portion to be at least one hundred inches long. Assuming the maximum degree of movement of an oscillatory pendulum counterbalancing means to be sixty degrees, an indicator or handle attached to said means and operable therewith equivalent to the radius of the arc containing such graduations, or, in other words, the indicator would have to be ten feet long. These figures clearly indicate that such structure is impracticable and explain the necessity of a circular dial and a rotatable indicator or hand having complete circular movement. However the advantages of direct indication from the source of movement is thus lost.

The usual method of obtaining a complete rotatable indicator movement is by associating a rack with the counterbalancing means, said rack being meshed with an independently mounted pinion to which the indicator is fastened. Generally the movement of the rack is from one to two and one-half inches with the pinion being of proportional pitch diameter. As the radius between the diameters of the pinion and the dial represent the visible indicating advantage, it is apparent that because of the high ratio between these two parts, extreme accuracy must be maintained in the manufacture and equipment of the rack and pinion. It is generally admitted that the most of the discrepancies in the indication can be attributed directly to the inaccuracies of these parts, namely, rack and pinion.

The size of the indicating dial or chart depends on the number and the spacing of graduations. Thus a circular dial provided adjacent to its perimeter with one thousand graduations spaced one-tenth of an inch apart would have a diameter of approximately thirty-two inches and an area of approximately eight hundred square inches. Assuming the graduations, together with the numerals, to occupy a space one inch in width and being one hundred inches in length, the total area of graduation space is one hundred square inches or one-eighth of the total dial area. Thus seven-eighths of the dial area is superfluous and represents a loss of space and material.

One of the principal objects of my invention is to provide an automatic weight indicating scale having a stationary indicating chart arranged so that the total area of the chart is utilized. In the case of the circular dial having one thousand graduations spaced one-tenth inch apart compared with a chart of my improved construction wherein the entire area of the chart is utilized, it will be seen that the effective reduction in area by the use of my improved chart is equal to seven hundred square inches.

Another important object of my invention is to provide simple means for indicating direct from the counterbalancing means, thereby eliminating the use of rack and pinion.

Still another object of my invention is to provide a condensed indicating mechanism that can be adapted to any ordinary platform beam scale.

Other objects of my invention are to arrange all of the weight indicia on a stationary chart in compact relation so that the entire area of the chart is utilized and to provide indicating means operable by the load actuated scale mechanism and cooperating with said chart so as to distinguish the effective or active weight indicia of the chart from the remaining portion of the chart.

Still other objects of the invention are to provide a weighing scale having a stationary chart arranged in exposed reading position and provided with weight indicia arranged in a plurality of juxtaposed rows whereby all of the weight indicia are visible at all times, and to provide suitable indicating means correlated with said chart and operatively connected to the scale mechanism and actuated thereby in accordance with the load placed on the scale platform whereby the weight indicia corresponding to the weight of the load is clearly differentiated from the successive weight indicia.

Further objects of the invention are to provide an automatic weight indicating scale having a stationary chart disposed in reading position and provided with weight indicia so arranged that all of said weight indicia are visible at all times, said chart being provided adjacent to each weight indicia with a translucent portion normally mounted by a suitable source of light, the operating mechanism of said scale being operatively associated with a suitable index plate interposed between said source of light and said chart and movable progressively from zero position to shut off the light or illumination of weight indicia between the zero and the weight indicia corresponding to the weight of the load.

Still other objects of the invention are to provide an automatic weighing scale having a stationary chart disposed in full view and provided with weight indicia arranged in a plurality of juxtaposed rows whereby all of the weight indicia are visible at all times and the entire area of the chart is utilized, there being formed adjacent to each row of weight indicia and coextensive therewith a slot closed by a translucent screen which can be illuminated from the interior and to provide a suitable index plate or indicator operable in conjunction with the scale mechanism and provided with a plurality of offset portions corresponding to the rows and the respective slots of said chart, said index plate being operable from zero position into a position from which it is projected in magnified form onto the inner side of said chart whereby the translucent openings extending from zero position to the weight indicia corresponding to the load placed on said scale are deprived of illumination, thereby being clearly distinguished from the remaining portions of the chart.

Additional objects of the invention are to provide an improved indicating means for automatic scales, said indicating means comprising a stationary chart having its exterior face provided with full sized weight indicia arranged in groups and an indicating member operable in direct ratio to loads placed on the scale and having a series of progressive offsets correlated to the respective groups, the edges of said offsets serving as indicators, said indicating members being adapted to be projected in magnified form into cooperative relation with said stationary member.

With these and other objects in view, my invention consists in certain novel features of construction and arrangement of parts, hereinafter more fully described and claimed, and illustrated in the accompanying drawings, in which—

Figure 3 is a vertical cross section taken on line 3—3 of Figure 2.

Figure 4 is a horizontal cross section taken on line 4—4 of Figure 2.

Figure 5 is an enlarged front elevational view of the stationary chart containing the weight indicia.

Figure 6 is a horizontal cross section taken horizontally of Figure 5 through the slotted portion of the chart.

Figure 7 is a vertical cross section taken on line 7—7 of Figure 2.

Figure 12 is a vertical cross section showing a modified form of the index plate.

Figure 13 is a horizontal cross section taken on line 13—13 of Figure 12.

Figure 15 shows still another modified form of my invention.

Figure 1:
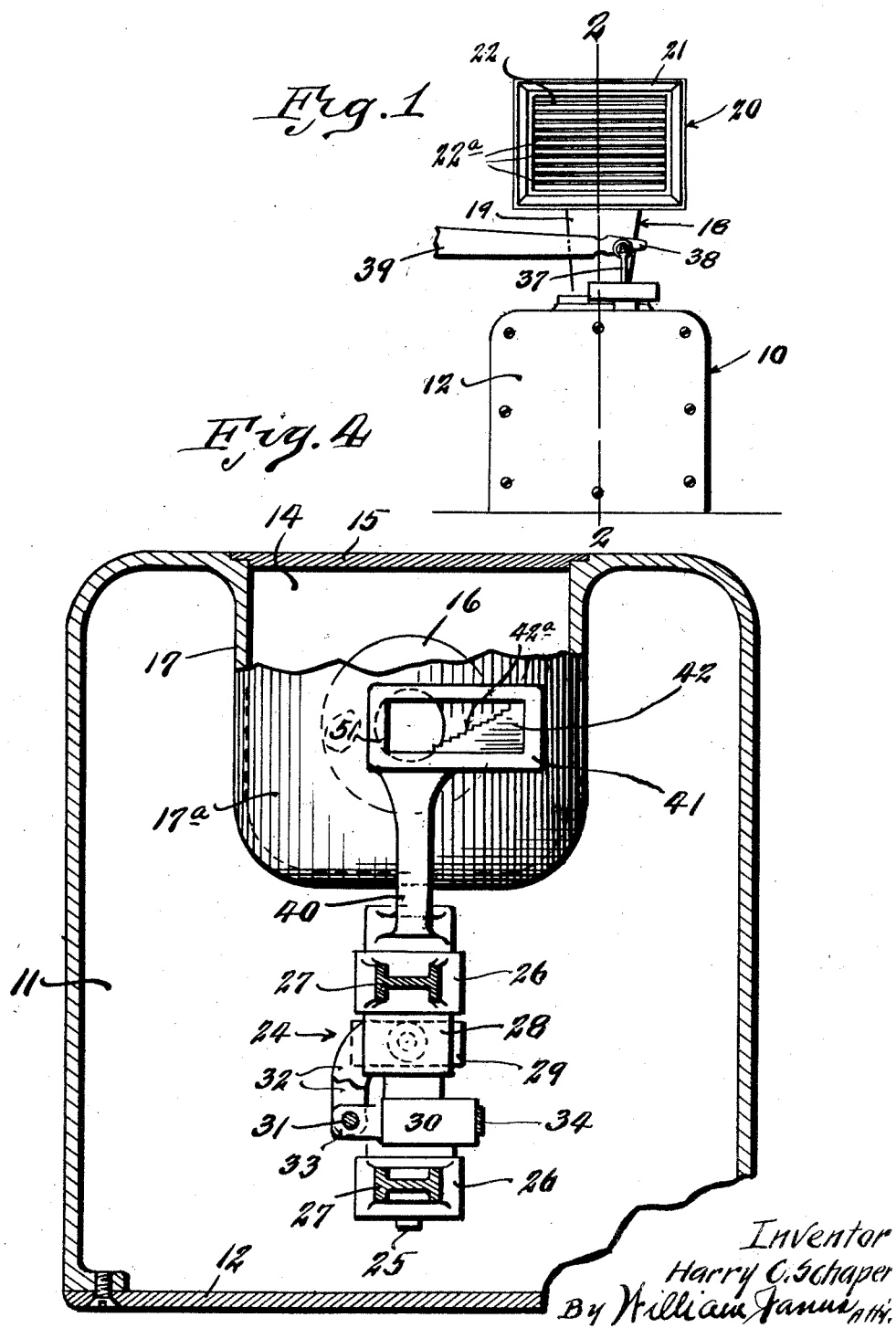
Figure 1 is a front elevational view of my improved automatic weighing scale.
Figure 2:
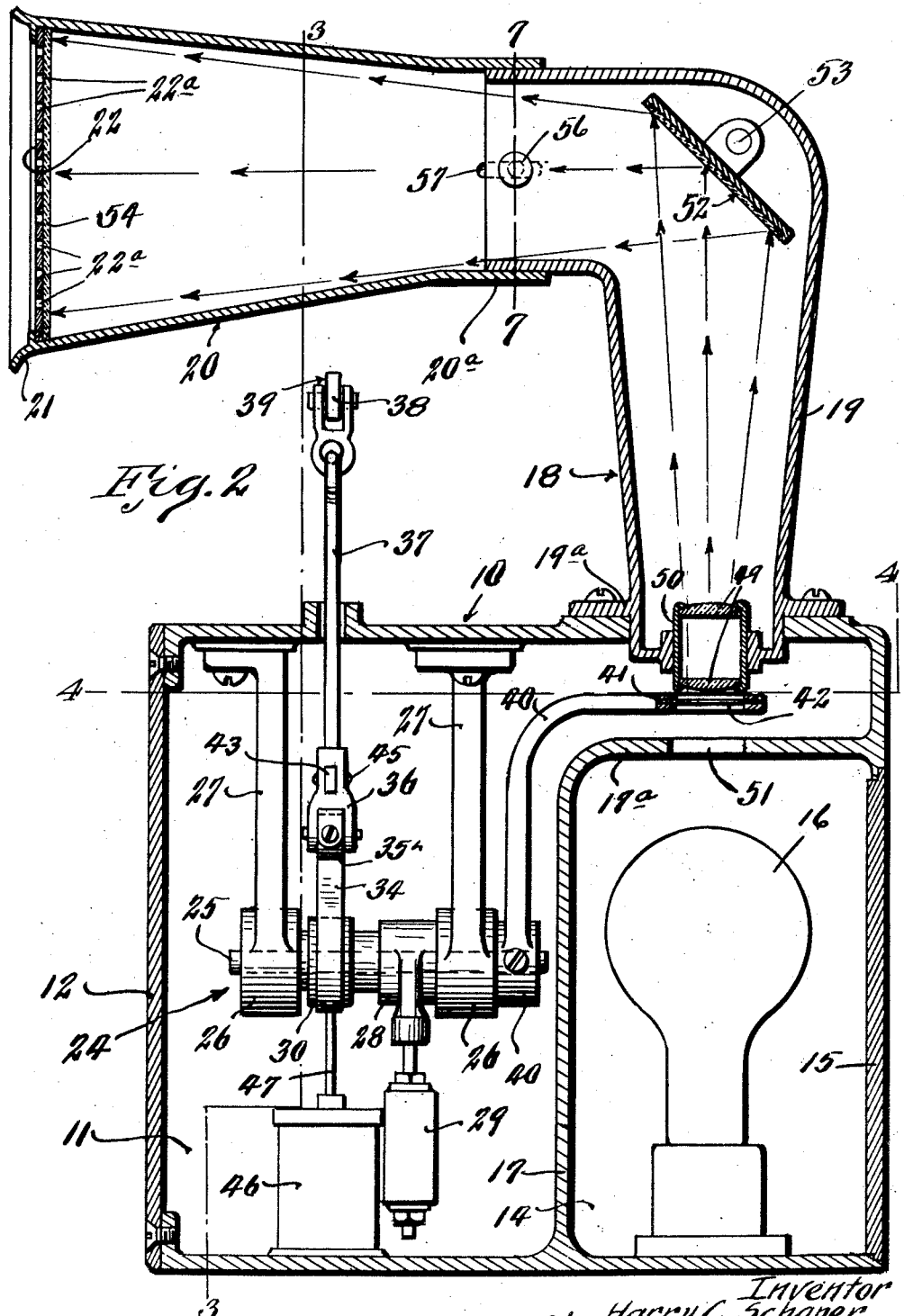
Figure 2 is an enlarged vertical cross section taken on line 2—2 of Figure 1.
Figure 8:
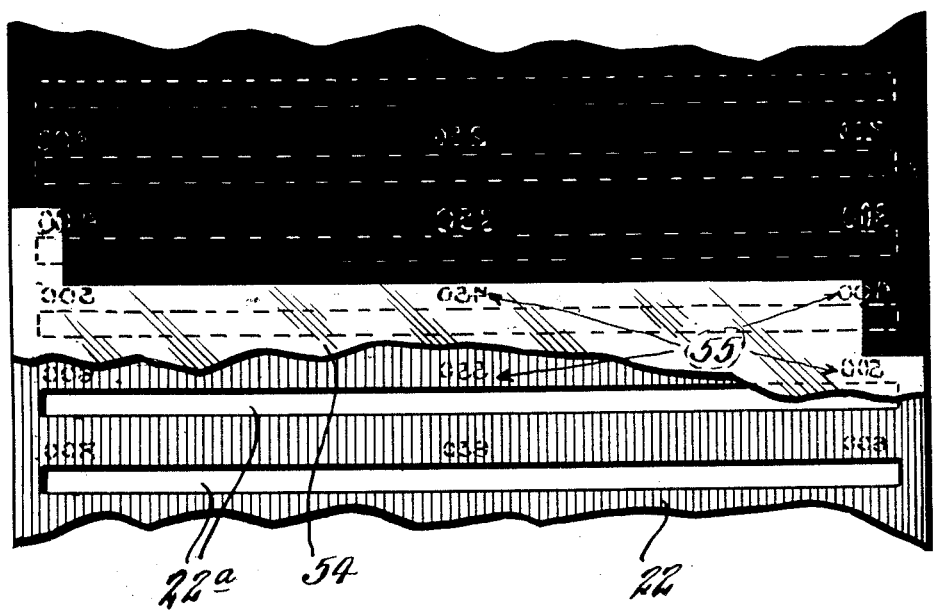
Figure 8 is a fragmental view of the rear face of the translucent screen with the image of the index plate projected thereon.

Briefly stated, the invention consists in so mounting an index plate that it is movable into the focus of a projecting means in accordance with the load placed on the platform of the scale. The projecting means which includes lens and source of light projects said index plate in an enlarged form onto a translucent screen located a suitable distance from said index plate and forming a background for a weight indicia chart. This chart is stationarily mounted adjacent to the opposite side of said screen and is provided on its face with a plurality of weight indicia arranged in a series of groups preferably in the form of a series of parallel spaced-apart rows. The chart is provided adjacent to each row with a slot of suitable width and of same length as the row. Thus narrow strips of translucent screen are exposed adjacent to each row of weight indicia.

When the scale occupies zero position, all of the translucent strips are illuminated and the outermost portion of index plate is so located that it is projected onto the first translucent strip in line with the zero mark. When a load is placed on the scale, the scale mechanism actuates the index plate accordingly so that the latter moves past the focus of the projecting means and brings the corresponding offset in proper position. Thus that portion of the screen onto which the index plate is projected is shaded or dark while the remaining portion of the screen remains illuminated. The result is that such slots or translucent strips which are within the range of the projected image of the index plate will be dark while the other slots or translucent strips remain illuminated. Thus the weight indicia which is equal to the load placed on the scale and such weight indicia which is under this weight have their translucent portions shaded, thereby clearly distinguishing the active or energized weight indicia from the remaining portion of the chart. It is to be noted that the entire contents of the weight indicia chart are exposed and readable at all times and that only the index plate is projected onto the screen back of the chart and that the proper weight indicia is selected by reading the shaded portion of the chart.

Referring by numerals to the accompanying drawings, 10 indicates a housing having a chamber 11 accessible through door 12 and a smaller chamber 14 accessible through a door 15. Chamber 14 contains a suitable source of light, such as an electric lamp 16 and is located rearwardly of chamber 11, being formed by a partition wall 17, the top wall 17a of which terminates short of the top wall of housing 10 and preferably being curved.

A tower or extension 18 is mounted on top of housing 10 immediately above chamber 14. This housing consists of a supporting section 19 and an adjustable section 20. The lower end of section 19 extends into chamber 11 and the upper end of said section is disposed horizontally and has telescopic engagement with end 20ª of section 20. The other end of section 20 is provided with a marginal flange 21 which forms a frame for the weight indicia chart 22.

In chamber 11 is located the operating mechanism 24 of the indicating means. This mechanism comprises a horizontally disposed shaft 25 which is journaled in bearings 26 formed in the lower ends of a pair of spaced vertically disposed brackets 27. These brackets are secured to the top wall of housing 10. A pendulum member 28 is fixed on shaft 25, preferably intermediate said brackets 27 and carries a pendulum 29. A cam member 30 is loosely arranged on said shaft adjacent to pendulum member 28 and is held in fixed relation therewith by a pair of oppositely disposed adjusting screws 31. These screws are screw-threaded in ears or lugs 32 formed integral with pendulum member 28 and projecting laterally therefrom rearwardly of cam member 30. The latter is provided with a tail or extension 33 which is disposed between and in spaced relation with said lugs and is engaged by the ends of the oppositely disposed screws 31. Thus by moving said screws in proper position said cam can be adjusted relatively to the axis of said shaft 25.

To the face of said cam is fixed one end of a tape or flexible member 34. This tape extends upwardly and has its upper end fixed to the periphery of a roller 35 which is mounted in the bifurcated lower end of a coupling 36. The upper end of this coupling is attached to the lower end of a vertically disposed rod or steelyard 37. Said rod extends upwardly and outwardly through the top of housing 10 and has its upper end connected to the free end 38 of a beam 39 of the scale in the usual manner.

Thus when said beam is actuated, for instance by placing a load on the scale platform, said end 38 moves upwardly, causing upward movement of rod 37 and coupling 36. This exerts pull on strap or tape 34, causing it, through its engagement with cam 30, to rock shaft 25. This rocking movement of the shaft displaces pendulum 29 moving it in an arc in ratio to the load placed on the scale. When the load is removed, the shaft and the cam move by gravity under the influence of said pendulum back to normal or zero position.

One end of shaft 25 has fixed thereto the lower end of an arm 40. This arm extends upwardly above the upper end of chamber 14 and extends horizontally thereof and terminates in a rectangular frame 41. As shown in the preferred embodiment of the invention, said frame is curved concentrically with the axis of shaft 25. An index plate 42 is arranged within frame 41. This index plate (see Fig. 9) is provided with a series of steps or offsets numbered in Figure 9 from zero to nine. Each offset corresponds to a definite movement of the scale. Thus when the scale is arranged for one thousand pounds capacity, as in the instant case, and the weight indicia are arranged in ten rows of one hundred pounds each, each step or offset is equivalent to one hundred pound load placed on the scale. Thus when one hundred pounds are placed on the scale platform the index plate moves the distance of one offset, namely from zero to one, and when a thousand pounds is placed on the scale platform the index plate moves the total distance of ten offsets, namely from zero to nine.

The index plate is comparatively small and is projected in enlarged form in correlation with the chart.

A horizontally disposed arm 43 is flexibly mounted at one end on one of the walls of housing 10 as indicated at 44 and the other end is pivotally connected to coupling 36 as indicated at 45. Thus said arm is rocked in vertical plane while the mechanism 24 is actuated. A dashpot 46 is arranged within housing 10 and the piston rod 47 thereof is pivotally connected at its upper end to arm 43 as indicated at 48. This arrangement serves to dampen the action of mechanism 24 in the usual manner and thus protects said mechanism against injury from shock and violent movements.

The projecting means consists of lamp 16 and a pair of projection lenses 49 arranged in a tubular holder 50. Light 16 is located in chamber 14 below index plate 42 and an aperture 51 is formed in top wall 17a to allow the light rays to pass upwardly. Tubular member 50 is preferably mounted in the lower end 19a of section 19 and is so arranged that lenses 19 are axially aligned with said aperture and with said lamp. The light rays pass from the source of light 16 through aperture 51 upwardly and are projected by the lenses onto a mirror or reflecting member 52 which is arranged in the upper end of section 19 and is adjustably mounted therein as indicated at 53. This mirror deflects the projected rays from vertical plane into horizontal plane onto a translucent screen 54 which is arranged immediately adjacent to the inner face of chart 22.

This chart is formed preferably of metal and is provided on its outer face with weight indicia 55 arranged, in the present instance, in ten horizontally disposed rows or groups spaced from each other. Each row, in the instant case, contains one hundred one pound divisions so that the chart is of one thousand pound capacity. It will be noted that all of the weight indicia are permanently arranged on the chart and are visible at all times. This chart is formed with a plurality of horizontally disposed slots 22a arranged between the groups of rows of weight indicia and substantially of same length. The translucent screen 54 is rendered visible through said slots. When the source of light 16 is energized the light rays are projected by means of lenses 49 and reflecting member 52 onto said screen 54. Thus the slots between the rows of weight indicia appear illuminated. When the index plate 42 is moved into position between the source of light and the lenses, part of the light rays will be shut off and a shadow will be cast on part of the screen so that certain of the translucent portions of the chart will be dark.

The index plate is provided with a series of offsets. These offsets are spaced laterally to correspond to the spacing of the rows and each offset is of sufficient length to correspond with the length of the row of weight indicia when said offset is projected in enlarged form onto said screen.

Thus when a load is placed on the scale, scale beam 39 is actuated, thereby causing mechanism 24 to be set in operation so that the index plate is moved into projected position in accordance with the load placed on the scale. Thus the light rays projected onto the screen are effected by the index plate so that portion of the screen and the translucent portion of the chart are deprived of illumination, thereby clearly distinguishing the weight indicia corresponding with the load from the weight indicia reading over the weight of the load.

The proper weight indicia giving the weight of the load is indicated by the end of the offset projected onto the screen which forms the dividing line between the shaded portion and the illuminated portion. When the load is removed from the scale, the mechanism 24 is restored to zero position, moving the index plate 42 away from the optical axis with the exception of the first offset, the end of which is projected onto the screen into alignment with the zero mark of the chart.

Sections 19 and 20 are formed with tapered walls so that the extension 18 tapers inwardly toward the projecting lenses. Preferably the sections are rectangular in cross section as shown in Figure 7. When the ends of sections 19 and 20 are arranged in telescopic relation they are held together by bolts 56 seated in the walls of the inner section and extending outwardly through horizontally disposed slots 57 formed in the outer section. A nut 58 is arranged on the threaded outer ends of bolts 56 and serves to secure said sections together in adjusted relation. The object of providing this adjustment is to permit chart 22 and the translucent screen to be adjusted relatively to the mirror so as to insure correct magnification of the index plate. The mirror is also adjustable to provide proper reflection and alignment of the projected image of the index plate onto the screen and the chart.

In the form just described, the optical axis of the projecting means is disposed vertically at right angles to the axis of rotation of the index plate 42 and said plate is curved concentrically with said axis of rotation of shaft 25.

In the form shown in Figures 12 and 13 the optical axis of projecting means 59 is disposed horizontally in parallel with the axis of shaft 25. Therefore, the segmental index plate 60 is formed flat for movement in a vertical plane.

In the preceding forms, the scale beam 39 is arranged above the housing 10 and said beam is connected to the operating mechanism contained in said housing by means of a steelyard 37 which extends upwardly from said housing.

Figure 14:
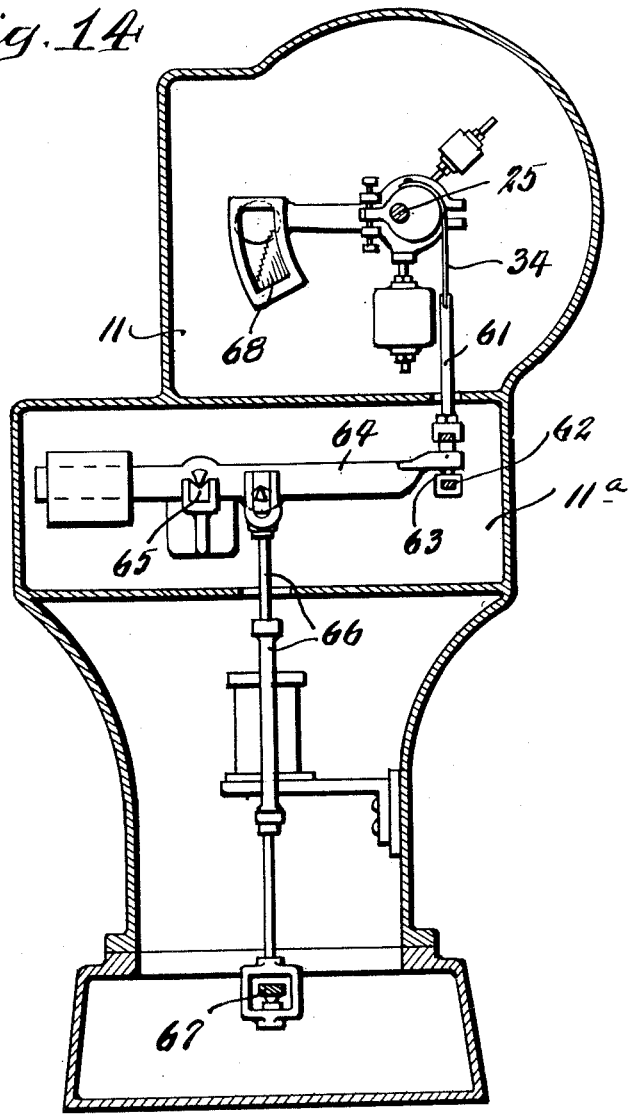
Figure 14 shows another modified form of my invention.

In the form shown in Figure 14, my improved automatic weight indicating means is shown connected to a platform scale wherein the beam lever is disposed below the indicating mechanism. In this form the top or flexible connection 34 extends downwardly and is connected at its lower end to the upper end of a rod 61 which extends downwardly into a chamber 11a formed below chamber 11. The lower end of this rod carries a stirrup 62 in which has bearing a cone-shaped bearing member 63. This bearing member is carried by a lever 64 which is fulcrumed in chamber 11a at 65 and is operatively connected by a rod 66 to the rear end of a lever 67. This lever is operatively mounted in the base of the scale and is part of the lever system carrying the platform. The indicating mechanism is similar to the one shown in Figures 12 and 13, the index plate 68 being similar to index plate 60.

In the modified form shown in Figure 15, lever 39ª is connected by a connection 37ª to a lever 68. To the ends of this lever are pivotally connected the upper ends of rods 69, the lower ends of which carry heads 70 to which are secured the upper ends of coiled springs 71. These coiled springs are under tension and have their lower ends attached to bosses 72 projecting upwardly from the base of the housing. These springs are adjusted so as to be balanced against each other so that the arm 68 occupies a substantially horizontal position. These springs form the counterbalancing means for lever 39a and serve to bring the latter into zero position when the load is removed from the scale. The projecting means 73 is so arranged that the optical axis is substantially in vertical plane with the axis of rod 37a. An index plate 74 is arranged vertically below arm 68 and is pivotally connected thereto as at 75, while the lower end of said plate has connected thereto a piston rod 76, the lower end of which carries a piston 77 operatively mounted in the dashpot 78. Thus the index plate 74 is movable in vertical plane, being moved upwardly through the action of lever 39a and being moved downwardly to zero position through the medium of springs 71.

In my improved scale, all of the weight indicia are visible at all times. This permits the chart to be made with the weight indicia formed or finished in any suitable manner which will enable easy and quick reading of said weight indicia. Thus the latter can be etched, cast, engraved, stamped, or otherwise formed on the chart and once formed cannot be changed in their relation or otherwise tampered with.

Figure 9:
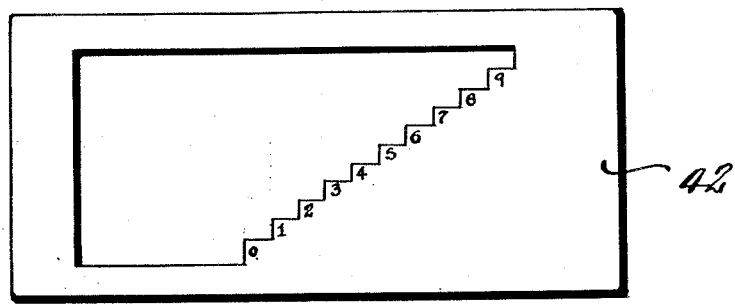
Figure 9 is an enlarged top plan view of the index plate.
Figures 10, 11:
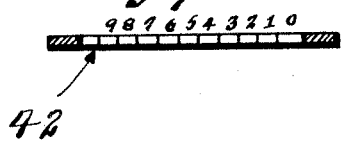
Figure 10 is an enlarged cross sectional view of the index plate before being curved.
Figure 11 is an enlarged detail cross section through the index plate and the holder thereof.

The chart member is formed of opaque material while the strip closing the elongated opening formed in said chart member adjacent to the indicia is formed of translucent material. When the source of light 16 is energized the entire strip is illuminated due to the projection of the light onto the rear side of the chart member and the strip. When the device or scale is at zero, the forward or index ends marked zero of the index plate 42 occupy positions within the optical axis or field of projection of the projecting means and thus this portion is projected in enlarged form onto the translucent strip. This index plate is so disposed with respect to the chart member that this forward portion or index end when thus projected is in line with the zero mark of the chart. Now if a load of say four hundred pounds is placed on the platform of the scale, lever 39 moves upwardly correspondingly and causes movement of the index plate until the offset marked 4 in Figure 9 is in the first or zero position. Thus the widths of the first four offsets (0, 1, 2, 3) are projected onto the corresponding translucent strips with the result that the groups marked 0 to 100, 100 to 200, 200 to 300, and 300 to 400 of the chart are deprived of illumination while that portion of the fifth group extending up to the 400 mark is also shaded. The remaining portion of the strip of group 400 to 500 as well as the remaining strips remain illuminated. The division line between the shaded or dark portion and the illuminated portion of the translucent strip designates the mark or indicia which corresponds to or indicates the weight of the load placed on the platform of the scale.

Where more than one group of weight indicia is used, as in the present instance, said groups are spaced from each other and preferably a single piece translucent screen is placed in the rear of said chart member so as to close all of the elongated openings or slots. Also the index plate is formed with offsets corresponding to the number of groups used on the chart. Each offset is equivalent in area, when projected in enlarged form onto the screen, to the area occupied by one row of weight indicia. Therefore, when the scale is actuated to bring the offset marked 4 in Figure 9 into zero position, the first four rows of weight indicia of the chart are completely covered by the projected portion of the index plate. Both the index plate and the screen can be adjusted so as to obtain proper alignment of the indicating lines or index ends of the offset with the weight indicia of the chart.

The reflecting member 52 is also adjustable to position the projected image of the index plate properly. The extension 20 is adjustable longitudinally to obtain proper magnification of the projected image.

In my improved weight indicating scale, the weight indicia carrying member is not actuated by the scale mechanism, and the weight indicia is not projected by the projecting means. The chart member is fixed and all of the weight indicia are readable at all times. Only the index plate or indicia selecting member is movable by the scale mechanism and projectable onto a translucent screen portion adjacent to the weight indicia.

The weight indicia corresponding to the load is selected not by means of a pointer or indicating member, but by the division of the shaded or dark portion of the translucent strip from the illuminated portion. While in the present instance that portion of the chart member which contains weight indicia under the weight indicated are dark or shaded and the weight indicia reading over the weight indicated are illuminated, this arrangement could be reversed so that the under weight indicia would be illuminated and the over weight indicia would be shaded or dark.

My improved weight indicating member is of simple and efficient construction and is accurate in operation. The selected indicia can be readily singled out from the remaining indicia and can be easily and conveniently read. The index plate is of simple construction, being preferably made from metal or other sheet material not subject to breakage under normal conditions. This index plate can be economically manufactured and easily placed in position.

Although I have shown and described herein several embodiments of my improved weight indicating means, it is obvious that various other forms and other changes in the construction and arrangement of parts of my invention could be made and substituted for those disclosed herein without departing from the spirit of my invention.

I claim:

1. An automatic weight indicating scale comprising in combination a weighing mechanism, a stationary chart provided on its face with a plurality of weight indicia arranged in progressive groups whereby all of said weight indicia are readable directly from said chart, said chart being provided with a plurality of translucent portions arranged adjacent to and coextensive with said groups, an index plate movably mounted and operatively connected to said weighing mechanism for movement in accordance with the actuation of said weighing mechanism, and projecting means including a source of light for projecting said index plate in an enlarged form onto said translucent portions, said index plate being formed with a plurality of offsets corresponding to the groups of weight indicia whereby the most advanced offset projected onto the corresponding translucent portion points out the weight indicia denoting the weight of the load used to actuate said weighing mechanism.

2. An automatic weight indicating scale comprising in combination a weighing mechanism, a housing, a stationary chart fixed on said housing and provided on its outer face with the full content of weight indicia arranged in progressive groups spaced from each other, a translucent portion arranged adjacent to and coextensive with each group, projecting means including a source of light arranged in said housing and projecting the light rays against the rear of said chart and onto said translucent portions, an index plate operatively mounted in said housing in correlation with said weighing mechanism whereby said plate is movable into position between said light and the projecting lenses in direct ratio with the load placed on said scale and is projected in enlarged form onto said translucent portions whereby the translucent portions of the weight indicia corresponding to the weight of the load are shaded, said index plate being provided with a plurality of offsets corresponding in number to said translucent portions, the forward end of each offset serving as the weight selection mark.

3. An automatic weight indicating scale comprising in combination with a scale mechanism, of a housing, a stationary chart mounted exteriorly of said housing and having its outer face provided with the entire content of weight indicia visible at all times, said weight indicia being arranged in spaced rows and said chart being formed with a plurality of elongated openings arranged adjacent to said rows and coextensive therewith, a translucent screen arranged against the inner side of said chart for closing said opening, a projecting means arranged in said housing, and an index plate operatively mounted in said housing and associated with said scale mechanism whereby said index plate is movable relatively to said projecting means in accordance with the load placed on said scale, said index plate being provided with a plurality of offsets corresponding to the disposition of the rows of said weight indicia, said offsets being arranged progressively whereby the forward end of each offset serves as weight indicating mark for the weight indicia of the respective row.

4. An automatic weight indicating scale comprising in combination with the scale mechanism, of a housing, a stationary chart mounted exteriorly of said housing and having its outer face provided with the entire content of weight indicia visible at all times, said weight indicia being arranged in spaced rows and said chart being formed with a plurality of elongated openings arranged adjacent to said rows and coextensive therewith, a translucent screen arranged against the inner side of said chart for closing said opening, a projecting means arranged in said housing, an index plate operatively mounted in said housing and associated with said scale mechanism whereby said index plate is movable relatively to said projecting means in accordance with the load placed on said scale, said index plate being provided with a plurality of offsets corresponding to the disposition of the rows of said weight indicia, said offsets being arranged progressively whereby the forward end of each offset serves as weight indicating mark for the weight indicia of the respective row, and means for counterbalancing said index plate and restoring it to zero position.

5. An automatic weight indicating scale comprising in combination with a weighing mechanism including a scale beam, of a housing, an index plate operatively mounted in said housing and operable by said scale beam in accordance with the load placed on said scale, a source of light in said housing arranged to one side of said index plate, projecting lenses arranged in the opposite side of said index plate in alignment with said source of light, a stationary chart fixed on said housing in spaced relation with said index plate, said chart being provided with a plurality of weight indicia arranged in a series of spaced rows, there being a slot formed in said chart adjacent to each row and coextensive therewith, a translucent screen arranged against the inner side of said chart and forming translucent windows on the weight indicia side, the light rays from said source of light being projected onto said screen so as to illuminate the translucent windows adjacent to said weight indicia rows, said index plate being movable to intersect certain of said light rays, thereby throwing a shadow on said screen whereby the weight indicia equivalent to or under the weight of the load are deprived of illumination, thereby clearly differentiating underweight indicia from overweight indicia.

6. An automatic weight indicating scale comprising in combination a weighing mechanism having a scale beam, a housing having an extension, a weight indicia chart fixed to the outer end of said extension and provided on its outer face with weight indicia arranged in progressive groups, said chart being provided adjacent to each group with a slot coextensive therewith, a screen of translucent material arranged against the inner side of said chart and closing said slots, an index plate movably mounted in said housing, a source of light arranged to one side of said index plate, projecting means arranged on the opposite side of said index plate for projecting the light rays onto said screen, and means for connecting said index plate to said scale beam whereby said index plate is movable in accordance with the load placed on said scale between said source and said projecting means whereby the shadow of said index plate is projected in enlarged form onto said screen, thereby depriving certain of said slots of illumination, said index plate being provided with a plurality of offsets corresponding to the rows of weight indicia on said chart whereby the forward end of each offset forms the indicating mark for the weight indicia of the corresponding group.

7. An automatic weight indicating scale comprising in combination with a movable part of the scale mechanism, of a housing, an index plate mounted therein and operable by said movable part in accordance with a load placed on said scale, means for restoring said index plate to zero position, a stationary chart arranged in spaced relation with said index plate and provided on its outer face with the complete content of the weight indicia arranged in a plurality of progressive groups, said chart being provided adjacent to each group with a translucent window coextensive therewith, and projecting means arranged in said housing for projecting the image of said index plate in an enlarged form onto said translucent windows rearwardly of said plate, said index plate being provided with a plurality of offsets corresponding to said rows, the forward end of each offset forming the indicating mark for the corresponding group of weight indicia.

8. An automatic weight indicating scale comprising a housing provided with a source of light, an extension on said housing, a projecting lens arranged in said housing in spaced relation with said light, a stationary chart fixed to the outer end of said extension and provided with a plurality of weight indicia marks arranged on its outer face in progressive groups, said chart being provided with a series of slots arranged adjacent to said groups and coextensive therewith, a translucent screen arranged against the inner side of said chart and forming closures for said slots, a gravity-actuated index plate operatively mounted in said housing and adapted to be actuated by the weighing mechanism in accordance with the load placed on said scale, said index plate being provided with a plurality of offsets movable between said source of light and said projecting means whereby the image of said index plate is projected in enlarged form onto said screen, thereby casting a shadow upon the translucent slots of the weight indicia reading from zero upwardly to the weight indicia equivalent to the weight of the load.

9. In an automatic weight indicating scale, the combination with a scale beam, of a housing having one of its walls provided with an extension, a chart fixed to the outer end of said extension and provided with a plurality of weight indicia arranged in a series of numerically progressive rows spaced from each other, there being a slot formed in said chart adjacent to each row and coextensive therewith, a screen of translucent material arranged adjacent to the inner side of said chart whereby portions of said screen are visible through said slots, an index plate movably mounted in said housing and operatively connected to said scale beam whereby said index plate is movable in accordance with the load placed on said scale, and a projecting means for projecting said index plate in an enlarged form onto said screen, said index plate being movable by said scale beam into the focus of said projecting means, whereby the translucent portions coextensive with the weight indicia equivalent to the weight of the load are rendered dark by the projected image of said index plate while the remaining translucent portions are illuminated.

10. In an automatic weight indicating scale, the combination with a scale beam, of a housing having one of its walls provided with an extension, a chart fixed to the outer end of said extension and provided with a plurality of weight indicia arranged in a series of numerically progressive rows spaced from each other, there being a slot formed in said chart adjacent to each row and coextensive therewith, a screen of translucent material arranged adjacent to the inner side of said chart whereby portions of said screen are visible through said slots, an index plate movably mounted in said housing and operatively connected to said scale beam whereby said index plate is movable in accordance with the load placed on said scale, a projecting means for projecting said index plate in an enlarged form onto said screen, said index plate being movable by said scale beam into the focus of said projecting means, whereby the translucent portions coextensive with the weight indicia equivalent to the weight of the load are rendered dark by the projected image of said index plate while the remaining portions are illuminated, and counterbalancing means for said index plate for normally maintaining the latter in zero position with respect to said chart.

11. In an automatic weight indicating scale, the combination with a scale beam, of a housing, an extension fixed to said housing and extending upwardly therefrom, a chart fixed to the outer end of said extension and provided with a plurality of weight indicia arranged in a series of numerically progressive rows spaced from each other, there being a slot formed in said chart adjacent to each row coextensive therewith, a screen of translucent material arranged adjacent to the inner side of said chart whereby portions of said screen are visible through said slots, a shaft journaled in said housing, an index plate mounted on said shaft in spaced relation therewith, a pendulum weighted member fixed to said shaft for counterbalancing said index plate and maintaining it in zero position, a source of light arranged in said housing to one side of said index plate, projecting means arranged in said housing on the opposite side of said index plate, an operative connection between said shaft and said scale beam whereby said index plate is moved from zero position in accordance with the load placed on said scale into a position between said source of light and said projecting lens, whereby said index plate is projected in an enlarged form onto said screen, thereby shading a portion thereof, said index plate being provided with lateral offsets corresponding to the rows of said weight indicia, the forward end of each offset forming an indicating mark for the corresponding row whereby the weight indicia aligned with said indicating mark denotes the weight of the load, the translucent portions of the weight indicia numerically below said mark being shaded and the translucent portions of the weight indicia above said mark being illuminated.

12. In an automatic weight indicating scale, the combination with a scale beam, of a housing, an index plate movably mounted in said housing and operatively associated with said scale beam for movement in accordance with the load placed on said scale, a fixed chart arranged in spaced relation with said index plate and provided on its outer face with the complete content of the weight indicia arranged in suitable groups, and projecting means arranged in said housing and adapted to project said index plate onto said chart to correlate the weight indicia of the latter with the load placed on said scale.

13. In an automatic weight indicating scale, the combination with a movable part of a scale, of a projecting means, a fixed chart arranged in spaced relation with said projecting means and provided on its face with the complete list of weight indicia arranged in spaced relation, a translucent portion arranged adjacent to said weight indicia, and an index plate operatively associated with said scale part and operable thereby into the optical axis of said projecting means whereby said index plate is projected onto said translucent portion to indicate the weight indicia corresponding to the load placed on said scale.

14. In a weighing scale, the combination with a movable part of a scale, of a housing, projecting means arranged in said housing and including a source of light and projecting lenses; a fixed chart arranged in the wall of said housing and having weight indicia arranged in a suitable group on its face, a translucent strip arranged on said chart adjacent to said group of weight indicia, there being an opening formed in said chart to expose said translucent strip interiorly, and an index plate operatively mounted in said housing and operatively associated with said scale part for movement in accordance with the load placed on said scale, said index plate being movable between said source of light and said projecting lens whereby a portion of said index plate is projected in an enlarged form onto said translucent strip, thereby indicating the weight indicia corresponding to the load placed on said platform.

15. In a scale, the combination with a movable part of a scale, of a housing, a source of light arranged therein, a projecting lens disposed in said housing in spaced relation with said source of light, an index plate movably mounted in said housing and operatively associated with said movable scale part whereby said index plate is movable between said source of light and said projecting lens in accordance with the load placed on said scale, and a chart plate forming a part of said housing and arranged in spaced relation with said projecting lens, said chart being provided on its face with the required weight indicia, there being an elongated opening formed in said chart member adjacent to said weight indicia, and a translucent strip disposed in said opening and adapted to have projected thereon the enlarged image of said index plate whereby that portion of the translucent strip disposed adjacent to the weight indicia corresponding to the load placed on the scale is deprived of illumination and is shaded when the balance of the translucent strip remains illuminated.

16. An indicating means comprising in combination a housing, a source of light arranged therein, a projecting lens spaced from said source of light, an index plate operatively mounted in said housing and movable between said source of light and said projecting lens, and a chart member of opaque material forming a part of the wall of said housing and provided on its face with a group of indicating characters arranged progressively, there being a narrow opening formed in said chart member adjacent to said group of indicating characters, and a translucent strip closing said opening and adapted to have projected thereon that portion of the index plate which is located between said source of light and said projecting lens, the line of division between the shaded and the illuminated portions of said translucent strip being used to indicate the selected indicating character.

17. In an automatic weight indicating scale, the combination with a load actuated scale part and a projecting means, of a stationary chart having a row of weight indicia arranged on its face, and an index plate actuated by said load actuated scale part in direct ratio to the load placed on a scale platform, said plate being projectable by said projecting means in a magnified form in correlated position with said weight indicia whereby the forward edge or index end of said plate designates the weight indicia corresponding to said load.

18. The combination with a weighing scale, of an automatic counterbalancing means including an index plate having a straight forward edge, a stationary chart having a row of weight indicia arranged on its outer face, a translucent screen arranged adjacent to said row of weight indicia, and a projecting means including a source of light and a projecting lens for projecting said index plate in an enlarged form onto said screen in accordance with the load placed on the platform of the scale.

19. In a weighing scale, the combination with the scale mechanism, of an automatic counterbalancing means including an index plate consisting of a series of laterally disposed offsets, a stationary chart provided on its face with a series of weight indicia arranged in rows spaced from each other to provide elongated openings, a translucent screen arranged on said chart adjacent to each row of weight indicia, and means including a source of light and projecting lenses for projecting the offsets of said index plate in an enlarged form onto said screens in accordance with the loads placed on the scale platform.

20. In a weighing scale, the combination of automatic counterbalancing means adapted to be actuated by a movable part of a scale, said means including an index plate having a plurality of laterally and longitudinally disposed offsets, a stationary chart provided on its face with a complete list of weight indicia arranged in spaced rows, said rows being spaced from each other by elongated openings formed in said chart member, a translucent screen arranged against the rear of said chart for closing said openings, and means including a source of light and projecting lenses for projecting said offsets in an enlarged form onto said screen in correlation with the load placed on the scale platform whereby one portion of the screen is shaded and the other remains illuminated, the line of division between said portions designating the correct weight.

21. In a weighing scale, the combination of a pivotally mounted load resisting member adapted to be actuated in direct ratio to the loads placed on a scale platform, said member including an index plate having a series of progressive offsets arranged in correlation with the axis of rotation of said pivotal member, a stationary chart having a series of spaced groups of weight indicia, said weight indicia being arranged in increasing numerical progression, a translucent screen arranged between each group of weight indicia, a source of light, and a projecting lens arranged in the path of travel of said index member whereby the offsets thereof are projected in an enlarged form onto said screens to differentiate the under weight indicia from the over weight indicia.

22. In an indicating means for weighing scales, a stationary chart provided on its face with a plurality of weight indicia arranged in a series of spaced groups, and a movable index plate operable by a part of a scale mechanism for movement relatively to said chart, said index plate being provided with a plurality of weight indicia selectors laterally and longitudinally offset to operate in alignment with the respective groups of said weight indicia, whereby one of said selectors is brought into indicating relation with the respective weight indicia in accordance with the load placed on said scale.

23. In indicating means for weighing scales, the combination with a projecting means and an index member operable in accordance with the load placed on a scale, of a stationary chart provided on its outer face with a complete list of weight indicia arranged in a plurality of rows, said rows being spaced from each other by elongated openings formed in said chart, and a translucent screen arranged against the rear side of said chart for closing said openings, said screen being arranged to receive the projected enlarged image of said index member for designating the selected weight indicia.

24. In an automatic weight indicating scale, the combination with a housing containing actuating mechanism operable by a movable part of a scale, of a projecting means arranged therein, an index plate carried by said actuating means and movable thereby into the optical axis of said projecting means in accordance with the load placed on said scale, and a stationary chart arranged in the wall of said housing and provided on its outer face with the complete list of weight indicia, there being an opening formed in said chart adjacent to said weight indicia, and a translucent screen arranged in said opening and adapted to receive the projected image of said index plate whereby the under weight indicia are clearly distinguished from the over weight indicia, the line of division indicating the correct weight.

25. In an indicating means of the class described, the combination with an actuating mechanism and a projecting means, of a plurality of stationary weight indicia arranged in a plurality of rows, an index plate carried by said actuating mechanism and operable thereby to intersect the optical axis of said projecting means, said index plate being provided with a plurality of selectors laterally and longitudinally offset to operate in alignment with the respective rows of said weight indicia.

26. An indicating means comprising in combination a housing, a projecting means arranged in said housing, a stationary chart of opaque material arranged in one of the walls of said housing and provided on its face with a complete group of indicating characters arranged in suitable relation with each other, said chart being provided with an elongated opening adjacent to said characters, a translucent screen arranged in said opening, and an index plate operatively mounted in said housing and movable into the optical axis of said projecting means, said index plate being of opaque material so as to intersect certain of said light rays and prevent their projection onto said translucent screen whereby such portion of said screen adjacent to the indicating characters corresponding to the movement of said index plate are shaded and the remaining portion remains illuminated.

27. An indicating means of the class described comprising in combination a housing, a stationary chart arranged in a wall of said housing and provided on its face with a plurality of weight indicia arranged in a series of spaced groups, there being an elongated opening formed adjacent to each group, a translucent screen arranged in each opening, an index plate operatively mounted in said housing and provided with a series of offsets spaced laterally and longitudinally, and projecting means for projecting said offsets in an enlarged form onto said translucent screens to designate the selected weight indicia.

28. In an automatic weight indicating scale, the combination with a movable part of a scale, of a housing, a projecting means arranged therein, an index plate movably mounted in said housing and operatively associated with said scale part for movement transversely of the optical axis of said projecting means in accordance with the load placed on the platform of said scale, a chart member forming a part of the wall of said housing and disposed in corelation with the optical axis of said projecting means, said chart being provided on its outer face with a row of weight indicia and an elongated opening arranged adjacent to said row of weight indicia, and a translucent screen arranged against the inner side of said chart member and visible through said opening, said index plate being projected in an enlarged form onto said screen whereby the front end of said index plate serves to point out the weight indicia corresponding to the load placed on the scale platform.

29. In an automatic weight indicating scale, the combination of a scale mechanism including a movable part thereof, a housing having one of its walls provided with an elongated opening and a row of weight indicia arranged on its outer face adjacent to said opening and coextensive therewith, a translucent screen arranged against the inner side of said wall and closing said opening, an index plate movably mounted in said housing and operable by said movable part in accordance with the load placed on the scale platform, and projecting means arranged in said housing for illuminating said screen, said index plate being movable into the optical axis of said projecting means so as to deprive a portion of the screen of illumination and thereby indicate the weight indicia corresponding to the load placed on the scale platform.

In testimony whereof I hereunto affix my signature this 4th day of August, 1930.

HARRY C. SCHAPER.